W. L. SHEPARD.
VARIABLE AND REVERSE SPEED MECHANISM.
APPLICATION FILED MAY 5, 1917.
1,297,599.
Patented Mar. 18, 1919.
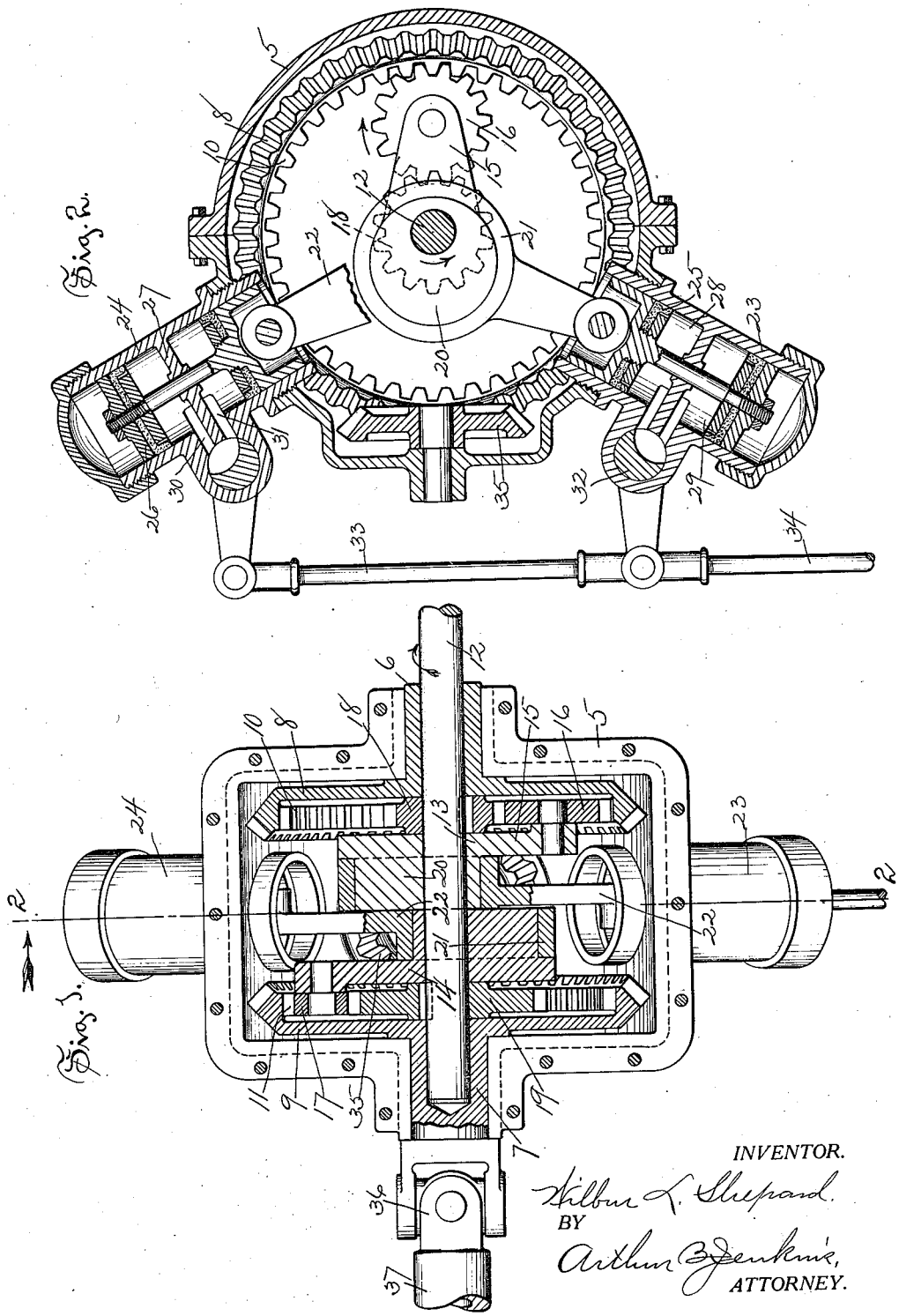
INVENTOR.
Wilbur L. Shepard.
BY
Arthur B. Jenkins,
ATTORNEY.

UNITED STATES PATENT OFFICE.

WILBUR L. SHEPARD, OF WEST HARTFORD, CONNECTICUT, ASSIGNOR TO THE WORLD GAS ENGINE COMPANY, OF HARTFORD, CONNECTICUT, A CORPORATION OF MAINE.

VARIABLE AND REVERSE SPEED MECHANISM.

1,297,599.  Specification of Letters Patent.  Patented Mar. 18, 1919.

Application filed May 5, 1917. Serial No. 166,763.

*To all whom it may concern:*

Be it known that I, WILBUR L. SHEPARD, a citizen of the United States, residing at West Hartford, in the county of Hartford and State of Connecticut, have invented a new and Improved Variable and Reverse Speed Mechanism, of which the following is a specification.

My invention relates to mechanism for imparting different rates of speed from a driving to a driven member and for reversing the direction of movement of the latter, and an object of my invention, among others, is to provide a device of this class that shall be extremely simple in construction and particularly efficient in operation.

One form of device embodying my invention and in the construction and use of which the objects herein set out, as well as others, may be attained, is illustrated in the accompanying drawings, in which—

Figure 1 is a view in central section lengthwise of the driving shaft, through a mechanism embodying my invention.

Fig. 2 is a view in cross section through the same on plane denoted by dotted line 2—2 of Fig. 1, the locking pinions being located in a different position from that shown in Fig. 1.

While a mechanism embodying my invention is not limited in its application, but may be applied to various structures in which it is desired to transmit variable rates of speed from a driving to a driven member, yet it may be here said that the improvement is especially applicable in the transmission of power from the shaft of the engine of an automobile to other parts of the driving mechanism, in that it simplifies the construction whereby changes in speed are effected and embodies in such structure the equivalent of the clutch that has hitherto been employed. The mechanism is thus not only simplified but the means required to operate the vehicle are lessened and likewise simplified.

In the accompanying drawings the numeral 5 indicates a case, preferably round in cross section, and composed of parts divided centrally on a plane passing diametrically through it, said parts being secured together in any ordinary manner. Openings are formed through opposite ends of the case, and the hubs 6—7 of bevel gears 8—9 are rotatably mounted in these openings. In addition to the usual teeth on the periphery of the bevel gears, they are also provided with internal gear teeth 10—11. Both of these bevel gears are loosely mounted on a driving shaft 12 that may be the engine shaft driven in the usual manner by the engine of an automobile. This shaft is loosely mounted in the hubs of the gears 8 and 9 to rotate independently thereof and it passes through the hub of the gear 8 and into a recess formed in the hub of the gear 9.

Carriers 13—14 are loosely mounted on the shaft 12, each carrier having a radially projecting arm 15, the outer end of which bears a stud upon which studs pinions 16—17 are rotatably mounted, said pinions meshing respectively with the sets 10 and 11 of the gear teeth on the gears 8 and 9. These pinions mesh with gears 18—19 keyed or otherwise secured to the shaft 12.

Eccentrics 20 are carried by each of the carriers 13 and 14, in the construction shown these eccentrics being preferably formed integral with the carrier, and eccentric straps 21 inclose said eccentrics. A pitman 22 rigidly secured to each of the eccentrics, extends therefrom into a cylinder, these cylinders 23—24 containing pistons 25—26 to which the pitmen are pivotally attached in a manner common to devices of this kind.

Each of these pistons comprises two heads located on opposite sides of the diaphragm 27 extending across each cylinder, and as shown in Fig. 2 of the drawings. This construction forms receiving chambers 28—29 on opposite sides of each diaphragm, each chamber receiving flow of liquid from the opposite chamber, caused by the movement of the piston in the cylinder. Ports 30 and 31 in each cylinder open from a valve chamber to each of the receiving chambers, flow of liquid through these ports being controlled as by means of a valve 32 in the valve chamber appurtenant to each cylinder, these valves being constructed to regulate the flow of liquid from one chamber into another as may be desired and for a purpose to be hereinafter described, each valve having a passage arranged to communicate simultaneously with both of the ports 30 and 31. These valves are pivotally attached to a connecting rod 33 for simultaneous operation as by means of a rod 34 that may extend to any accessible point for operation by the driver of a vehicle.

A connecting bevel pinion 35 is pivotally mounted on the wall of the case, preferably in a recess therein, this pinion being for the purpose of communicating the movement of the gear 8 to the gear 9 and vice-versa.

The hub 7 of the gear 9 may be connected as by a link 36 with a driven shaft 37 comprising a part of the driving mechanism of the vehicle, and through which power is transmitted from an engine to the vehicle wheels. The arms 15 are located opposite the thicker parts of the eccentric so that the structure is balanced.

A liquid, preferably of a heavier sort, is placed within the cylinders between the heads of the pistons and in such quantities as may be required to effect the best results, it having been found that enough to not quite fill one of the chambers 28 or 29 when the valve closes the port to that chamber will serve the purpose satisfactorily under certain conditions. When thus supplied with liquid and the engine shaft 12 being driven, the gears 18 and 19 will be rotated and communicate rotative movement to the pinions 16 and 17, and the structure will thus be in condition to effect the actions required of it. The parts being thus equipped and the shaft 12 rotating in the direction indicated by the arrow, the gears 18 and 19 will be rotated in the same direction. The connection by the pinions 16 and 17 of said gears with the bevel gears 8 and 9, and the resistance to movement of the last mentioned gears by reason of their connection with the running gear of the vehicle and one with another, will cause the carrier arms 15 to be rotated in the same direction as that of rotation of the shaft 12, and through the connection by the eccentrics 20 the pistons 25 and 26 will be reciprocated in their respective cylinders and the liquid within the cylinders will be shifted from one side to the other of the diaphragms 27.

If a resistance to movement of the carriers 13 and 14 be caused, when this resistance becomes sufficient the carriers will cease their rotative movement and the pinions 16 and 17 will, therefore, impart movement to the gears 8 and 9. For instance, if resistance to movement of the carrier 14 be effected, as by operation of the valve appurtenant to the cylinder 24, the gear 9 will be caused to rotate in a direction opposite to that in which the shaft 12 is rotated and thus drive the vehicle forward. In this movement of the parts the gear 8, by reason of its connection by the pinion 35 with the gear 9 will rotate in the direction opposite to that in which the gear 9 is rotating, and this will be permitted by reason of the fact that the action of the gear 8 upon the carrier 13, through the connection of the pinion 16, is exerted to move said carrier in the same direction as that caused by the connection of the gear 18 with said carrier through the pinion 16.

If resistance to movement of the piston in the cylinder 24 be removed and a resistance be interposed to movement of the piston in the cylinder 23, the action of the parts will be reversed to that above described and the shaft 37 will be driven in a direction opposite to that hereinbefore set out and the vehicle will be driven backwardly, it being noted that the relative size of the gear 18 and pinion 16 when compared with the gear 19 and pinion 17 is such as to cause the slower movement required in backing.

It will also be noted that the connection between the valves 32 is such that when full resistance to the movement of one piston exists such resistance will be entirely removed from the other, and that the resistance to movement of one piston will be gradually reduced and removed before resistance to movement of the other piston takes place.

It will be obvious that the structure herein disclosed may be readily adapted for driving a motorcycle, which requires to be driven in a forward direction only, one of the sets of gears, pistons and cylinders being omitted, and it will further be readily seen that one of the sets of gears, pistons, and cylinders may be adapted for imparting movement to a driven shaft in two directions, and as, in accordance with the provisions of the patent statutes, I have described the principles of operation of my invention, together with the device which I now consider to represent the best embodiment thereof I desire to have it understood that the device shown is only illustrative, and that the invention can be carried out by other means.

I claim—

1. A driving shaft, a driven shaft, a cylinder, a piston located therein, a driven member having a driving connection with the driven shaft and a separate connection with the driving shaft, a connection between the driven member and said piston, said parts acting to cause movement of said driven member when resistance to movement of the piston exists, and means for causing resistance to movement of the piston.

2. A driving shaft, a driven shaft, a cylinder, a piston located therein, a driven gear having driving connection with the driven shaft and a separate connection with the driving shaft, a geared connection between said driven gear and the piston, said parts acting to effect movement of the driven gear when resistance to movement of the piston exists, and means for causing resistance to the movement of the piston, 3. A driving shaft, a driven shaft, a cylinder, a piston located therein, a driven gear in driving connection with the driven shaft and in separate driving connection with the driving shaft, an eccentric loosely mounted on the driving shaft and operatively connected with said piston, a geared connection between said eccentric and said driven gear and said parts acting to effect movement of the latter when resistance to movement of the eccentric exists, and means for causing resistance to movement of the piston and consequently to said eccentric.

4. A driving shaft, a driven shaft, a cylinder, a piston located therein, a driven gear in driving connection with the driven shaft and in separate driving connection with the driving shaft, an eccentric loosely mounted on the driving shaft and operatively connected with said piston, a pinion carried by said eccentric and in mesh with said driven gear, a geared connection between said pinion and driving shaft, and means for causing resistance to movement of said piston.

5. A driving shaft, a driven shaft, a driven gear loosely mounted on the driving shaft and in driving connection with the driven shaft, an eccentric loosely mounted on the driving shaft and in separate driving connection with the driving shaft, a piston operatively connected with said eccentric, a cylinder to receive said piston, a pinion carried by said eccentric, a gear keyed to the driving shaft and in mesh with said pinion, and means for causing resistance to movement of said pinion.

6. A driving shaft, a driven shaft, two sets of connecting members each set including a piston, a cylinder, an eccentric and a driven member, one of which driven members is in driving connection with the driven shaft, a geared connection between said driven member and the eccentric and also between said driven member and the driving shaft, a pinion connecting said driven members, and means for causing resistance to movement of said piston.

7. A driving shaft, a driven shaft, two sets of connecting members each set including a piston, a cylinder, an eccentric and a gear loosely mounted on the driving shaft, one of which gears is in driving connection with the driven shaft, a geared connection between said gear and one of said eccentrics and also between said gear and driving shaft, a pinion connecting the two first mentioned gears in both sets, and means for causing resistance to movement of said piston.

8. A driving shaft, a driven shaft, two sets of connecting members each set comprising a piston, a cylinder, an eccentric and a gear, one of which gears is in driving connection with the driven shaft, a gear secured to the driving shaft, a pinion in mesh therewith and with the said gear connected with the driven shaft, said pinion being supported by one of said eccentrics, a pinion connecting the two first mentioned gears in both sets, and means for causing resistance to movement of said piston.

9. A driving shaft, a driven shaft, and two sets of connecting members each set comprising a piston, a cylinder, an eccentric loosely mounted on the driving shaft and operatively connected with the piston, an arm extending from said eccentric, a pinion rotatably mounted on said arm and a gear in mesh with said pinion, one of said gears being in driving connection with the driven shaft, a gear secured to the driving shaft, and in mesh with said pinion, a pinion connecting the gears in both sets first mentioned as in engagement with the pinion, and means for causing resistance to movement of said piston.

10. A driving mechanism including a plural number of cylinders, pistons mounted in said cylinders, driving mechanism connected with said pistons, means for supplying fluid to said cylinders, a valve to regulate flow of the fluid to opposite sides of each piston, and means for simultaneously operating said valves.

11. A driving mechanism including a plural number of cylinders, pistons mounted in said cylinders, each piston comprising two members with a chamber between them, a diaphragm in each of said chambers, a valve to control flow of fluid from one to the other side of each of said diaphragms, and a connection between said valves to effect simultaneous operation thereof.

12. A driving mechanism including a cylinder, a piston mounted in said cylinder, driving mechanism connected with said piston, means for supplying fluid to said cylinder to oppose movement of said piston in opposite directions, a valve to regulate flow of fluid and control the resistance to the movement of said piston in opposite directions, and means for operating said valve.

13. A driving shaft, a driven shaft, a cylinder, a piston located therein, a carrier mounted on the driving shaft and operatively connected with the piston, a driven member having a driving connection with the driven shaft and a separate connection with the driving shaft, a connection between said driven member and said carrier, said parts acting to cause movement of said driven member when resistance to movement of the piston exists, and means for causing resistance to movement of the piston.

WILBUR L. SHEPARD.